United States Patent [19]

Schmitter

[11] Patent Number: 4,465,152

[45] Date of Patent: Aug. 14, 1984

[54] PRECISION BALANCE WITH IMPROVED IMMUNITY TO TEMPERATURE AND PRESSURE VARIATIONS

[75] Inventor: Albert Schmitter, Maennedorf, Switzerland

[73] Assignee: Mettler Instruments AG, Greifensee, Switzerland

[21] Appl. No.: 441,442

[22] Filed: Nov. 15, 1982

[30] Foreign Application Priority Data

Jul. 29, 1982 [CH] Switzerland ............... 4589/82

[51] Int. Cl.³ .................................... G01G 21/28
[52] U.S. Cl. .............................. 177/180; 177/238
[58] Field of Search ............... 177/180, 181, 239, 243, 177/190, 191, 192, 193, 194, 195, 196, 197

[56] References Cited

U.S. PATENT DOCUMENTS

| 1,084,886 | 1/1914 | Katterheinrich | 177/197 |
| 1,551,726 | 9/1925 | Birk | 177/180 |
| 2,614,825 | 12/1948 | Kadlec | 177/181 |

Primary Examiner—Harry E. Moose, Jr.
Assistant Examiner—M. J. Reinhart
Attorney, Agent, or Firm—Marianne Rich

[57] ABSTRACT

Slots are provided in at least one wall or surface common to the weighing chamber and the chamber housing the weighing mechanism. These slots are located so that air currents streaming through them will not affect the weighing dish and thereby the measured results. The slots are preferably located in the bottom near the front wall or the rear wall of the weighing chamber. The air currents can then effect rapid temperature and pressure compensation.

13 Claims, 2 Drawing Figures

PRECISION BALANCE WITH IMPROVED IMMUNITY TO TEMPERATURE AND PRESSURE VARIATIONS

Cross reference to related Applications and Publications: Fed. Rep. of Germany Utility Model No. 81 04 877.

FIELD OF THE INVENTION

The present invention relates to precision scales having a weighing chamber which encloses the weighing dish. The chamber has at least one window which may be opened and closed and is contiguous to a second chamber in which the weighing mechanism is housed.

Precision balances of this type are known as analytical balances or microbalances. They have either two weighing dishes or, more often, a single weighing dish. The dish may be suspended from above or supported from below. The type of weighing mechanism may be either mechanical or electro-mechanical.

A particular problem that may arise in precision balances of this type is that air movement may falsify the results. During weighing, the weighing chamber is of course closed, thus protecting the weighing dish from outside air currents. However, errors may also result by, for example, pressure differences arising in the opening and closing of the window. Similarly, temperature differences between the weighing chamber and the second chamber may constitute a source of error, particularly if electrical components in the second chamber generate heat losses.

The type of balance in which the dish is supported from below is particularly subject to the above errors if the dish is placed over an opening in the floor of the weighing chamber. This type of problem has been alleviated by providing a part underneath the dish which shunts any air currents away from the dish (Germany Utility Model Pat. No. 81 04 877). This known arrangement results in considerably increased cost, however, since additional parts and an exact fitting of the shunting element are required. In addition, the height of this type of balance is necessarily increased.

SUMMARY OF THE INVENTION

It is an object of the present invention to prevent the errors due to air currents detailed above without any substantial increase in cost or any increase in height of the balance. In accordance with the present invention at least one through-opening is provided in one surface forming the weighing chamber. The through-opening is located so that air currents flowing there-through will not affect the weighing dish. Such openings or slots result in rapid pressure equalization after opening and closing of the window, i.e., they prevent undesired pressure reductions or increases, the air movement taking place outside of the region of the opening in the weighing chamber which accommodates the support for the weighing dish. Additionally, temperature differences between the weighing chamber and the second chamber will result primarily in air movement through the openings provided in accordance with the present invention and, therefore, again allow the measurement to be unaffected thereby.

Preferably, the through-openings are arranged at the height of the weighing dish. If they were arranged at a higher point, a chimney effect might result.

In a preferred embodiment, the through-openings or slots are arranged along the floor of the weighing chamber at the front of the balance. This arrangement is suitable when the stop for the window of the weighing chamber is at the front of the balance. A ridge is provided between the slots and the weighing dish so that small amounts of spilled material (e.g. powder or liquid) do not fall into the chamber below.

In a particularly preferred embodiment, the through-openings are slots in a ledge interposed between the floor and front surface of the weighing chamber. A ledge of this type is often provided in conventional balances as a connecting element. To provide slots in such a ledge would result in only a nominal increase of the cost of the balance.

The novel features which are considered as characteristic of the invention are set forth in particular in the appended claims. The invention itself, however, both as to its construction and its method of operation, together with additional objects and advantages thereof, will best be understood from the following description of specific embodiments when read in connection with the accompanying drawing.

DESCRIPTION OF THE PREFERRED EMBODIMENT

Figure 1:
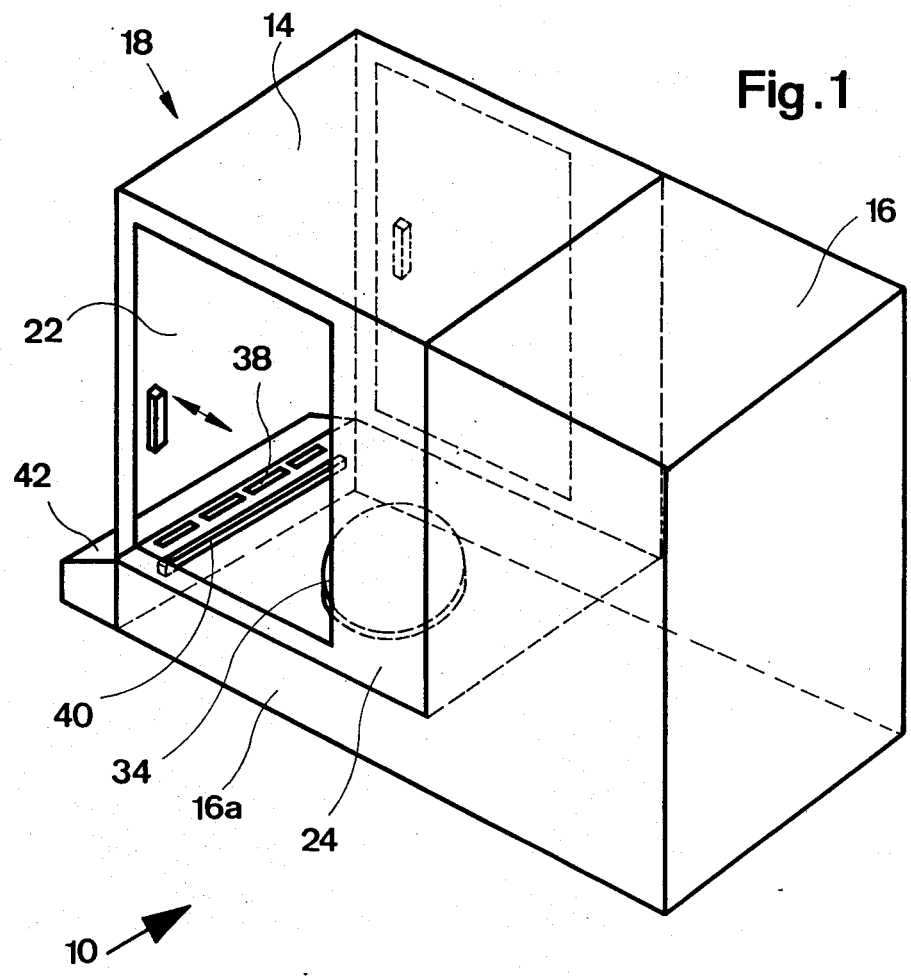
FIG. 1 is a perspective view of the balance.
Figure 2:
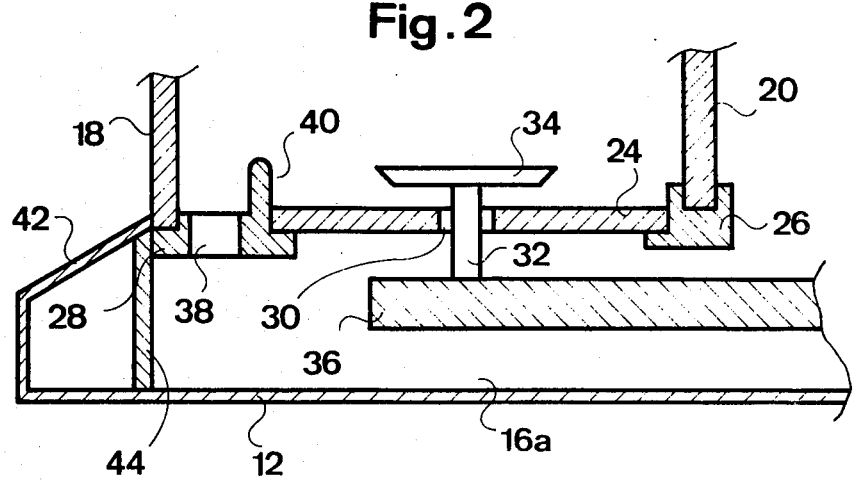
FIG. 2 is a partial sectional view through the lower part of the weighing chamber.

An eledctro-mechanical analytical balance 10 consists of a housing 12 which encloses two chambers, namely a weighing chamber 14 and a second chamber 16. Housing 12 has a front wall constituted by a glass front 18 of weighing chamber 14 and a wall 44 of second chamber 16. The main part of chamber 16 is behind weighing chamber 14, while a smaller part 16a is underneath the weighing chamber. The weighing mechanism is housed in chamber 16. The rear wall of chamber 16, namely the wall of chamber 16 opposite rear wall 20 of chamber 14, also constitutes the rear wall of housing 12. It consists of a load receiving member, a lever, a permanent magnet system for electro-magnetic force compensation, and electrical components. Balances of this type are well known and a description of their operation is not required for an understanding of the present invention. Such a description is therefore not supplied.

Weighing chamber 14 in addition to glass front 18, has a rear wall 20 and two side walls, both of which include a sliding window 22 (double arrow in FIG. 1). A bottom plate 24 separates weighing chamber 14 from the front part 16a of chamber 16 and thus constitutes a common wall between the two chambers. Bottom plate 24 is held at the rear by a ledge 26 and at the front by a similar ledge 28. It has a bore 30, which accommodates a pin 32 with play. The pin supports the dish 34. Pin 32 rests on an extension 36 of the load receiving member, which is located in the main part of chamber 16 and is not illustrated in the drawing.

Ledge 28, which is situated between bottom plate 24 and the glass front 18, has a number of slots 38 which allow relatively free air circulation between chamber 16, 16a and weighing chamber 14. It should be noted that this air movement takes place without affecting dish 34 to any substantial extent. A ridge 40 is parallel to the glass front 18 and to slots 38. It performs a double function: First, it prevents the material weighed, if spilled, from entering the lower chamber 16a. Secondly, it directs the stream of air flowing through slots 38. It is essential that the free cross sectional area of slots 38 is substantially larger than the free (ring shaped) cross section 30 around pin 32. If not, a considerable amount of air movement would take place in the vicinity of dish 34. A cross sectional area ratio 1:10 or more has been found effective. In the example given herein a ratio of 1:20 was used.

Second chamber 16 has a front extension 42 which houses the display and the controls. It is separated by a wall 44 from the rest of the chamber 16, 16a.

In some cases, it may be desirable to provide slots in other surfaces as well. For example, slots may be provided both near the front and (or in) the rear wall of the weighing chamber.

While the invention has been illustrated in a preferred embodiment, it is not to be limited to the structures shown, since many variations thereof will be evident to one skilled in the art and are intended to be encompassed in the present invention as set forth in the following claims.

I claim:

1. In a precision balance furnishing a weight signal, said balance having weighing apparatus comprising a weighing dish, a weighing mechanism, means connecting said weighing apparatus to said weighing mechanism, a weighing chamber having a plurality of surfaces enclosing said dish, a second chamber enclosing said weighing mechanism and having a common wall with said weighing chamber, said common wall having at least one through-passage for accomodating said connecting means, the improvement comprising at least one unobstructed through-opening spaced apart from said at least one through-passage and located away from said weighing dish in one of said surfaces for permitting airflow in said weighing chamber in a region away from said weighing dish, whereby the temperature and pressure in said weighing chamber are equalized with those of said second chamber without affecting said weight signal.

2. A precision balance as set forth in claim 1, wherein said through-passage has a free cross sectional area permitting airflow around said connecting means;

and wherein said through opening has an unobstructed cross-sectional area substantially larger than said free cross sectional area of said through-passage.

3. A precision balance as set forth in claim 2, wherein said unobstructed cross-sectional area is at least ten times said free cross sectional area.

4. A precision balance as set forth in claim 2, wherein said through-opening is in said common wall.

5. A precision balance as set forth in claim 1, wherein said at least one through-opening comprises a plurality of slots.

6. A precision balance as set forth in claim 1, wherein said through-opening is at approximately the same height as said weighing dish.

7. A precision balance as set forth in claim 1, wherein one of said surfaces of said surfaces of said weighing chamber constitutes the floor thereof; and wherein said at least one through-opening is a plurality of slots in said floor.

8. A precision balance as set forth in claim 7, further comprising a ridge interposed between said slots and said weighing dish, whereby entry into said second chamber of spilled portions of the substance being weighed is prevented and said airflow is directed away from said weighing dish.

9. A precision balance as set forth in claim 7, wherein said precision balance has a housing having a front wall and wherein said plurality of slots is near said front wall.

10. A precision balance as set forth in claim 7, wherein said balance has a housing having a front wall, said front wall also constituting one of said surfaces enclosing said weighing dish;

further comprising a ledge interposed between said front wall of said balance and said floor of said weighing chamber, said ledge having said slots.

11. In a precision balance furnishing a weight signal, said balance having a weighing dish, a weighing mechanism, means for connecting said weighing dish to said weighing mechanism, a weighing chamber having a plurality of surfaces enclosing said dish, a second chamber enclosing said weighing mechanism and having a common wall with said weighing chamber, said common wall having a through-passage for accomodating said connecting means, said through-passage having a free cross sectional area around said connecting means, the improvement comprising at least one through-opening having an unobstructed cross sectional area substantially larger than said free cross-sectional area of said through-passage in one of said surfaces for permitting airflow in said weighing chamber in a region away from said weighing dish, whereby the temperature and pressure in said weighing chamber are equalized with those of said second chamber without affecting said weight signal.

12. A precision balance as set forth in claim 11, wherein said through-opening has an unobstructed cross-sectional area at least ten times said free cross sectional area of said through-passage.

13. A precision balance as set forth in claim 12, wherein said unobstructed cross-sectional area of said through-opening is twenty times as large as said free cross sectional area of said through-passage.

* * * * *